(12) United States Patent
Shaikh et al.

(10) Patent No.: US 10,388,971 B2
(45) Date of Patent: Aug. 20, 2019

(54) FUEL CELL STACK THERMAL MANAGEMENT

(71) Applicant: FORD GLOBAL TECHNOLOGIES, LLC, Dearborn, MI (US)

(72) Inventors: Furqan Zafar Shaikh, Troy, MI (US); Sunil Katragadda, Canton, MI (US); W. Cary Cole, Livonia, MI (US); Colby Jason Buckman, Brownstown, MI (US); Phillip Bonkoski, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 628 days.

(21) Appl. No.: 15/065,333

(22) Filed: Mar. 9, 2016

(65) Prior Publication Data
US 2017/0263954 A1    Sep. 14, 2017

(51) Int. Cl.
| | |
|---|---|
| *H01M 8/04007* | (2016.01) |
| *H01M 8/04029* | (2016.01) |
| *H01M 8/04223* | (2016.01) |
| *H01M 8/0432* | (2016.01) |
| *H01M 8/04746* | (2016.01) |
| *H01M 8/04992* | (2016.01) |
| *F28D 20/02* | (2006.01) |

(Continued)

(52) U.S. Cl.
CPC ...... *H01M 8/04052* (2013.01); *F28D 20/021* (2013.01); *F28D 20/023* (2013.01); *H01M 8/04029* (2013.01); *H01M 8/04074* (2013.01); *H01M 8/04253* (2013.01); *H01M 8/04358* (2013.01); *H01M 8/04701* (2013.01); *H01M 8/04768* (2013.01); *H01M 8/04992* (2013.01); *H01M 8/04225* (2016.02); *H01M 2008/1095* (2013.01); *H01M 2250/20* (2013.01); *Y02E 60/145* (2013.01); *Y02T 90/32* (2013.01)

(58) Field of Classification Search
CPC .. H01M 10/625; H01M 10/633; H01M 10/48; H01M 10/613; H01M 10/6563
USPC .......................................................... 429/90
See application file for complete search history.

(56) References Cited

U.S. PATENT DOCUMENTS

| | | | |
|---|---|---|---|
| 6,013,385 A * | 1/2000 | DuBose | ............ H01M 8/04014 429/410 |
| 6,416,893 B1 | 7/2002 | Clingerman et al. | |

(Continued)

*Primary Examiner* — Anthony R Jimenez
(74) *Attorney, Agent, or Firm* — David Kelley; Brooks Kushman P.C.

(57) ABSTRACT

Fuel-cell thermal management systems and control schemes therefore are disclosed. In one embodiment, the system may include a fuel-cell stack, a heat-exchanger, a thermal battery including a material having a melting temperature of 50-120° C., a first coolant loop including the fuel-cell stack and the thermal battery and excluding the heat-exchanger, and a second coolant loop including the fuel-cell stack, the thermal battery, and the heat-exchanger. The first and second coolant loops may be configured to heat and cool the fuel-cell stack, respectively. The system may include a controller or processor configured to direct coolant to transfer heat from the thermal battery to the fuel-cell stack based on a negative heat rejection status of the fuel-cell stack and to transfer heat from the fuel-cell stack to the thermal battery based on a positive heat rejection status of the fuel-cell stack when the thermal battery is below a target temperature.

20 Claims, 3 Drawing Sheets

(51) Int. Cl.
*H01M 8/04701* (2016.01)
*H01M 8/04225* (2016.01)
*H01M 8/1018* (2016.01)

(56) References Cited

U.S. PATENT DOCUMENTS

| | | |
|---|---|---|
| 6,562,503 B2 | 5/2003 | Grasso et al. |
| 6,602,624 B1 | 8/2003 | Doan et al. |
| 6,656,616 B2 | 12/2003 | Boneberg et al. |
| 6,821,663 B2 | 11/2004 | McElroy et al. |
| 6,905,791 B2 | 6/2005 | Busenbender |
| 7,147,071 B2 * | 12/2006 | Gering ............... B60H 1/00278 237/12.3 B |
| 7,943,263 B2 | 5/2011 | Brantley et al. |
| 8,661,800 B2 | 3/2014 | Levin et al. |
| 8,794,195 B2 | 8/2014 | Levin et al. |
| 8,839,613 B2 | 9/2014 | Levin et al. |
| 2004/0001985 A1 * | 1/2004 | Alva ................ H01M 8/04029 429/435 |
| 2007/0099080 A1 * | 5/2007 | Pickett, Jr. ............ H01M 4/38 429/188 |
| 2008/0305370 A1 | 12/2008 | Melzner et al. |
| 2011/0262842 A1 | 10/2011 | Yang et al. |
| 2013/0189594 A1 | 7/2013 | Breit et al. |

\* cited by examiner

FUEL CELL STACK THERMAL MANAGEMENT

TECHNICAL FIELD

The present disclosure relates to fuel cell stack thermal management, for example, using a phase change material.

BACKGROUND

Fuel cells, such as hydrogen fuel cells, are one potential source of low-emissions energy. Vehicles powered by fuel cells may reduce emissions and reliance on oil-based fuel. However, the use of fuel cells in vehicles may pose certain challenges. One example of a technical challenge may be proper thermal management of the hydrogen fuel cell stack. During operation, the fuel cell may have a maximum operating temperature that should not be exceeded. Accordingly, heat dissipation systems may be necessary in the vehicle. On the other hand, fuel cells also have minimum operating temperatures and the components of the fuel cell should be prevented from freezing. Therefore, in areas that may experience very low temperatures, such as 0° C., active heating systems may be needed to keep the fuel cell temperature elevated. Both heating and cooling systems may add additional components to the fuel cell system, which may in turn add complexity, occupy volume in the vehicle, and increase costs.

SUMMARY

In at least one embodiment, a fuel-cell thermal management system is provided. The system may include a fuel-cell stack; a heat-exchanger; a thermal battery including a material having a melting temperature of 50-120° C.; a first coolant loop including the fuel-cell stack and the thermal battery and excluding the heat-exchanger; and a second coolant loop including the fuel-cell stack, the thermal battery, and the heat-exchanger. The first and second coolant loops may be configured to heat and cool the fuel-cell stack, respectively.

The system may also include a third coolant loop including the fuel-cell stack, the thermal battery, and a heater core coupled to a climate control system, the third coolant loop may be configured to transfer heat from the thermal battery to the heater core. They system may further include a first temperature sensor configured to measure an inlet temperature of coolant entering the fuel-cell stack and a second temperature sensor configured to measure an outlet temperature of coolant leaving the fuel-cell stack. In one embodiment, the first and second temperature sensors are the only coolant temperature sensors in the system.

In one embodiment, the material has a latent heat of fusion of at least 100 kJ/kg. the system may further include a first pump included only in the second coolant loop and a second pump disposed upstream of an inlet of the fuel-cell stack. The first coolant loop may include an orifice restrictor downstream of the thermal battery and upstream of an inlet of the fuel-cell stack. In one embodiment, the system includes a three-way valve downstream of the thermal battery and configured to direct coolant to the first or second coolant loops. The first coolant loop may be configured to heat the fuel-cell stack when it is below a target operating temperature and cool the fuel-cell stack when it is above the target operating temperature.

In at least one embodiment, a fuel-cell thermal management system is provided. The system may include a fuel-cell stack; a heat-exchanger; a thermal battery including a material having a latent heat of fusion of over 100 kJ/kg; a first coolant loop including the fuel-cell stack and the thermal battery; a second coolant loop including the fuel-cell stack, the thermal battery, and a heater core coupled to a climate control system; and a third coolant loop including the fuel-cell stack, the thermal battery, and the heat-exchanger.

In one embodiment, the system further includes a first temperature sensor configured to measure an inlet temperature of coolant entering the fuel-cell stack and a second temperature sensor configured to measure an outlet temperature of coolant leaving the fuel-cell stack. In another embodiment, the material in the thermal battery has a melting temperature of 50-120° C. The system may also include a first pump included only in the third coolant loop and a second pump disposed upstream of an inlet of the fuel-cell stack. The first coolant loop may be configured to heat the fuel-cell stack when it is below a target operating temperature and cool the fuel-cell stack when it is above the target operating temperature. In one embodiment, the third coolant loop is configured to cool the fuel-cell stack when the fuel-cell stack is above the target operating temperature and cool the thermal battery when it is above a target temperature.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a fuel-cell thermal management system, including a fuel-cell stack, a heat-exchanger, and a thermal battery. The fuel-cell thermal management system also includes a processor configured to direct coolant to transfer heat from the thermal battery to the fuel-cell stack based on a negative heat rejection status of the fuel-cell stack and to transfer heat from the fuel-cell stack to the thermal battery based on a positive heat rejection status of the fuel-cell stack when the thermal battery is below a target temperature. Other embodiments of this aspect include corresponding computer systems, apparatus, and computer programs recorded on one or more computer storage devices, each configured to perform the actions of the methods.

Implementations may include one or more of the following features. The system where the processor is further configured to direct coolant to transfer heat from the thermal battery to the heat-exchanger when the thermal battery is above the target temperature. The system where the processor is further configured to direct coolant to transfer heat from the fuel-cell stack to the heat-exchanger based on a positive heat rejection status of the fuel-cell stack. The system where the processor is further configured to direct coolant to transfer heat from the fuel-cell stack to the thermal battery based on a positive heat rejection status of the fuel-cell stack when the thermal battery is above a target temperature and the heat-exchanger is at a maximum cooling capacity. The system where the processor is further configured to direct coolant to transfer heat from the thermal battery to a heater core of a climate control system. Implementations of the described techniques may include hardware, a method or process, or computer software on a computer-accessible medium.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

There may be several important factors to consider for a cooling system for fuel cells (e.g., hydrogen fuel cells). One factor is that the nominal operating temperature of a proton exchange membrane fuel cells (PEMFC, also known as polymer electrolyte membrane fuel cell) may have an upper limit, such as about 95° C. Therefore, the driving force for heat rejection/removal may be significantly less than that in a typical internal combustion engine (ICE) cooling system. Another factor is that most or all of the waste heat load may need to be removed by an ancillary cooling system, since the exhaust streams may contribute little in heat removal. These two factors may require vehicle fuel cell systems to have relatively large radiators or heat exchangers. Providing volume/space for such large radiator(s) may present a significant design challenge. In addition, PEM fuel cells may tolerate only a relatively small temperature variation. For example, a cell temperature below a certain range may lead to water condensation and flooding of electrodes, which may result in a voltage loss caused by added resistance to reactant mass transport. Accordingly, fuel cells may have stringent thermal requirements that can present a significant heat transfer problem.

In addition to cooling, there may be heating issues associated with the use of fuel cells. During low ambient conditions, the fuel cell stack may need to withstand low or freezing temperatures without incurring damage. For example, a fuel cell vehicle may need to be either stored above a certain temperature (e.g., 0° C.) at all times or it may need to be actively protected from freezing (e.g., by heating). One approach to this issue may be the use of electric resistance heating to keep certain parts above freezing (or other minimum temperature) and insulation may be used to reduce the power required. This low power system may protect only the fuel cell stack, using, for example, insulation or immersion or water/ethylene glycol (WEG) heaters and a pump to heat the stack up powered by a 12V auxiliary electric system. Even if the stack kept above freezing, damage may occur if the fuel cell system is started up with some parts of the cooling system below freezing that then circulate through the stack before it begins to produce heat.

Figure 1:
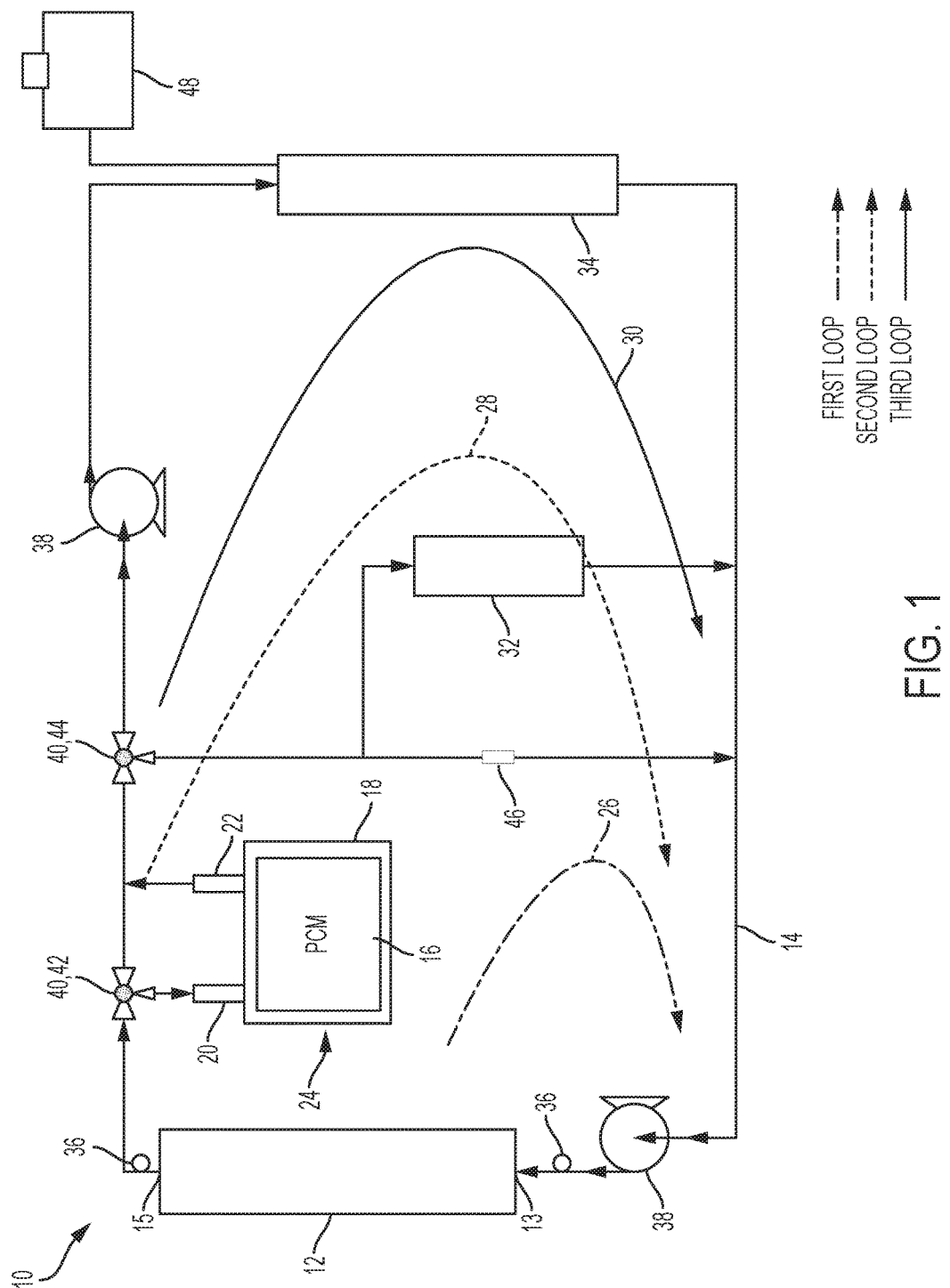
FIG. 1 is a schematic diagram of a thermal management system for a fuel cell stack, according to an embodiment.

With reference to FIG. 1, a thermal management system (TMS) 10 (e.g., heating and/or cooling) is disclosed that uses a phase change material (PCM) to buffer the temperature of a fuel cell stack. The disclosed system may be used in a vehicle, however, it may also be used in other applications. The thermal management system 10 may be connected to a fuel cell stack 12. The fuel cell stack 12 may have any known structure and design. The fuel cell stack 12 may be a hydrogen fuel cell stack. The fundamental structures of fuel cells are known to those of ordinary skill in the art and will not be described in detail. In general, fuel cells, for example, hydrogen fuel cells, include a repeating stack of fuel cell unit cells. Each cell may include a negative electrode (anode), an electrolyte, and a positive electrode (cathode). In a proton exchange membrane fuel cell (PEMFC), the electrolyte is a solid, proton-conducting membrane that is electrically insulating but allows protons to pass through. Typically, the fuel source, such as hydrogen, is introduced at the anode using a bipolar or flow field plate where it reacts with a catalyst and splits into electrons and protons. The protons travel through the electrolyte to the cathode and the electrons pass through an external circuit and then to the cathode. At the cathode, oxygen in air introduced from another bipolar plate reacts with the electrons and the protons at another catalyst to form water. Multiple fuel cell unit cells may be packaged together to form a fuel cell stack.

The TMS 10 may include conduit 14, such as tubing, hoses, or piping, configured to carry or transport coolant. The conduit 14 may connect or couple to an inlet 13 and an outlet 15 of the fuel cell stack 12. The fuel cell stack 12 may include an inner coolant path (not shown) that may carry the coolant within the stack and extract or provide thermal energy to the fuel cell components. The fuel cell stack 12 shown in FIG. 1 is schematic only, and the inlet 13 and outlet 15 may have any suitable location or arrangement. The conduit 14 may be formed of any suitable material and may be rigid or flexible. Non-limiting examples of suitable conduit materials may include rubber or elastomers, such as ethylene propylene diene monomer (EPDM) rubber, or metals, such as steel (e.g., mild), copper, aluminum, or others. In addition, the coolant used in the TMS 10 may be any suitable coolant, such as water, ethylene or propylene glycol mixed with water, oils, or other fluids.

The TMS 10 may include a phase change material (PCM) 16. The PCM 16 may be packaged or disposed within a housing 18. The walls of the housing 18 may be insulated using any suitable insulating material and/or the walls may be vacuum sealed to insulate the PCM 16. The housing 18 may have an inlet 20 and an outlet 22 that are configured to receive and return coolant from the conduit 14. Similar to the fuel cell stack 12, the housing 18 in FIG. 1 is schematic only, and the inlet 20 and outlet 22 may have any suitable location or arrangement. The PCM 16 and the housing 18 may be collectively referred to as a PCM thermal capacitor or as a thermal battery 24. As described in additional detail below, the thermal battery 24 may be configured to buffer the temperature of the fuel cell stack, assist in cold start, improve vehicle cabin warm-up, and/or assist in heat rejection during operation of the fuel cell stack.

The phase change material (PCM) 16 may be a material having a high heat capacity and/or a high latent heat of fusion. Heat capacity (e.g., specific heat capacity) generally refers to the amount of heat or energy necessary to raise the temperature of one gram of a substance by one degree Celsius. Latent heat of fusion generally refers to the amount of heat or energy necessary to change the state of a substance from a solid to a liquid. The specific heat of fusion may be the amount of heat or energy that is required to transform one unit of weight (e.g., 1 gram) from solid to liquid without any change in temperature. Accordingly, heat capacity refers to the heat/energy that raises the temperature of a substance in a given state (e.g., solid or liquid) and latent heat of fusion refers to heat/energy that contributes to a phase change (e.g., solid to liquid) at a constant temperature. The heat or energy that is absorbed or released during a phase change may be referred to as latent heat, while the heat or energy that is absorbed or released during a temperature change may be referred to as sensible heat.

In order to store, absorb, and/or release a high amount of energy, the PCM 16 in the thermal battery 24 may have a high heat capacity and/or a high latent heat of fusion. This may mean that the material requires a relatively large amount of energy in order to increase its temperature or to change from a solid to a liquid (melt), respectively. Either of these properties may allow the PCM 16 to absorb a large amount of thermal energy from the coolant in the conduit 14 and then release a large amount of energy into the coolant at a later time. In addition to, on instead of, the PCM 16 having a high heat capacity and/or latent heat of fusion, the quantity of the PCM 16 in the thermal battery 24 may be increased in order to increase the capacity of the thermal battery 24. The greater the amount (e.g., mass) of the PCM 16 in the thermal battery 24, the more energy that may be stored and later released.

The phase change material (PCM) 16 may be any material having a relatively high heat capacity and/or a high latent heat of fusion. The PCM 16 may also have a melting temperature that is within the range of temperatures that may be experienced by the coolant (e.g., between about 0° C. and 120° C.). However, materials having a melting temperature outside of this range may also be used. In one embodiment, the PCM may have a phase change or melting temperature of 0° C. to 120° C., or any sub-range therein, for example, 50° C. to 120° C., 60° C. to 120° C., 70° C. to 120° C., or 80° C. to 120° C. In another embodiment, the PCM may have a latent heat of fusion of at least 100 kJ/kg, for example, at least 110, 120, 150, 200, 250, 300, or 350 kJ/kg. The PCM may have a latent heat of fusion of 100 to 400 kJ/kg, 120 to 400 kJ/kg, 200 to 400 kJ/kg, or 300 to 400 kJ/kg. The PCM may be any type of material, such as an organic material, a wax, a salt, an alcohol, or others. Non-limiting examples of specific materials that may be used as the PCM 16 may include organic PCMs from Rubitherm GmbH, such as RT 70 HC, RT 80 HC, RT 90 HC, or RT 100 (e.g., RT 100 has a melting temperature of 100° C. and a latent heat of 124 kJ/kg); water (e.g., melting temperature of 0° C. and a latent heat of 334 kJ/kg); paraffin (e.g., melting temperature of 60° C. and a latent heat of 220 kJ/kg); salts (e.g., $NaNO_3$, melting temperature of 306° C. and a latent heat of 114 kJ/kg); erythritol (e.g., melting temperature of 118° C. and a latent heat of 349 kJ/kg); or $Sr(OH)_2.8H_2O$ (e.g., melting temperature of 90° C. and a latent heat of 375 kJ/kg).

In at least one embodiment, the thermal management system (TMS) 10 may include one or more coolant loops. For example, there may be three coolant loops 26, 28, and 30, as shown in FIG. 1. A first cooling loop 26, which may be referred to as a cold start or freeze protection loop, may circulate coolant through the conduit 14 through the fuel cell stack 12 and the thermal battery 24. In one embodiment, the fuel cell stack 12 and the thermal battery 24 are substantially the only thermal loads on the first loop 26. As used herein, components such as valves, sensors, and pumps are not considered thermal loads, since they do not absorb or release significant amounts of thermal energy from or into the coolant.

A second loop 28, which may be referred to as the heater core or cabin loop, may circulate coolant through the conduit 14 through the fuel cell stack 12, the thermal battery 24, and a heater core 32. In one embodiment, the fuel cell stack 12, the thermal battery 24, and the heater core 32 are substantially the only thermal loads on the second loop 28. The heater core 32 may be connected or coupled to a climate control system of the vehicle (e.g., automobile, boat, plane, etc.). If the fuel cell stack 12 is not powering a vehicle, the heater core 32 may be connected to another system that could makes use of excess heat, such as an HVAC system of a building.

A third loop 30, which may be referred to as the heat rejection or radiator loop, may circulate coolant through the conduit 14 through the fuel cell stack 12, the thermal battery 24, and a radiator or heat exchanger 34. In one embodiment, the fuel cell stack 12, the thermal battery 24, and the radiator 34 are substantially the only thermal loads on the third loop 30. The radiator or heat exchanger 34 may be any suitable device for dissipating heat from a coolant. For example, the radiator may include fins or other high surface areas components that transfer the thermal energy from the coolant to the ambient surroundings. The radiator may include a long coolant path, such as a winding or serpentine cooling path, in order to increase the contact time of the coolant with the radiator.

In addition to the thermal loads mentioned above, additional components may be present in one or more of the coolant loops. Temperature sensors 36 may be located at or coupled to one or more locations within the TMS 10. In one embodiment, a temperature sensor 36 may be configured to measure the temperature of the coolant, or the conduit 14 carrying the coolant, at the inlet and outlet of any or all of the thermal loads (e.g., by being located at or remotely coupled to the inlet/outlet or nearby location). For example, temperature sensors 36 may be configured to measure the temperature of the inlet/outlet of the fuel cell stack 12, the thermal battery 24, the heater core 32, and/or the radiator 34. In the embodiment shown, there may be two temperature sensors 36, one located at the inlet 13 and one located at the outlet 15 of the fuel cell stack 12.

Other components may also be present in the TMS 10, such as pumps and valves. The number of pumps may vary depending on the configuration and size of the TMS 10, such as the length of the conduit 14. In one embodiment, the TMS 10 may include at least one pump 38, which may be an electric pump. In the example shown in FIG. 1, the TMS 10 includes two pumps 38. One pump 38 may be disposed near the inlet 13 of the fuel cell stack 12. This pump 38 may therefore be positioned within all three loops 26, 28, 30. A second pump 38 may be disposed upstream of the radiator 34. This pump may be positioned only in the third loop 30, and may assist in overcoming the flow restriction due to the radiator 34. However, as described above, additional pumps 38 may be positioned within the TMS 10 in order to improve flow rate, overcome flow restrictions, or for any other purpose. In addition, only a single pump 38 may be present in some embodiments.

One or more valves 40 may be included in the TMS 10. The valves 40 may control the flow of the coolant through the conduit 14 and may control which thermal load is active (e.g., absorbing or releasing energy from/to the coolant). The valve(s) 40 may be electronically controlled valves, such as solenoid valves. The valve(s) 40 may be one-way, two-way, three-way, four-way, or more, or any combination thereof In at least one embodiment, there may be a three-way valve 42 positioned between the fuel cell stack 12 and the thermal battery 24. This valve may control whether coolant in the conduit 14 travels through the thermal battery 24 or not.

If it is determined (described in more detail below) that coolant is to travel through the thermal battery 24, the valve may open such that coolant flows to the inlet 20 of the housing 18, through the PCM 16, and out of the outlet 22 of the housing. If it is determined that coolant is not to travel through the thermal battery 24, the valve may close the conduit that leads to the inlet 20 and open to a conduit that bypasses the thermal battery 24. To avoid reverse flow, any or all of the inlets and outlets of the thermal load components in the TMS 10 may have one-way valves or check valves.

Another three-way valve 44 may be positioned downstream of the thermal battery. This valve may control which loop(s) the coolant in the conduit 14 may flow through. In the embodiment shown, this three-way valve may control whether the coolant flow through the first and second loops 26, 28 or through the third loop 30. If it is determined that coolant is to travel through the first and/or second loops 26, 28, the valve may open such that coolant does not flow through the radiator 34. If it is determined that coolant is to travel through the third loop 30, the valve may open such that coolant does flow through the radiator 34.

The first and second loops 26, 28 may initially share the same conduit 14, but there may be a split downstream of the three-way valve 44 that divides the two loops. The split between the two loops may or may not have a valve. In the embodiment shown, there is no valve and the first and second loops may flow in parallel. However, there may be a valve, such as a three-way valve positioned at the split to control whether the flow travels through the first loop 26, the second loop 28, or both. Alternatively, a four-way valve may replace the three-way valve 44, above, and the three loops may be separated from each other at the four-way valve (e.g., instead of sharing the same conduit). One of ordinary skill in the art, based on the present disclosure, will understand that the exact configuration of the conduit 14 and the valves 40 may vary depending on the design of the TMS 10.

In addition to pumps and valves, there may be other components in the TMS 10. For example, there may be one or more orifice restrictors 46 positioned within or attached to the conduit 14. In the embodiment shown, there is an orifice restrictor positioned within or attached to the conduit 14 in the first loop 26. This restrictor may at least partially control the flow rate through the first loop 26 and the second loop 28, which may have a heater core 32 therein. The orifice restrictor may help prevent flow erosion in the system. There may also be a degas bottle 48 included in the TMS 10, for example, coupled to the radiator 34. The components shown and described are not intended to be limiting, and other components that may be part of coolant systems may be included. As described above, in view of the present disclosure, one of ordinary skill in the art may rearrange or reconfigure components of the system based on the vehicle and TMS design.

The components of the TMS 10 may be connected to or electrically coupled to a controller. For example, fuel cell stack, the temperature sensor(s), electric pump(s), and valve(s) may be connected to and controlled by a controller or multiple controllers. Accordingly, the temperature, flow rate, or other properties of the coolant at various locations within the system may be received and processed/analyzed by the controller. The controller may also receive and/or calculate information regarding vehicle operating conditions, such as speed or acceleration. The controller may therefore calculate certain parameters of the TMS 10 and/or fuel cell stack 12 based on the information received or calculated/estimated (e.g., based on models).

By calculating or estimating certain parameters of the TMS 10, the number of sensors or other components may be reduced. For example, while temperature sensors may be disposed at the inlet and outlet of each thermal load in the system, the number of sensors may be reduced to, for example, two temperature sensors at the inlet 13 and outlet 15 of the fuel cell stack 12 (e.g., as shown in FIG. 1). The temperature of the coolant at other locations of the TMS 10 may then be estimated based on other known values or calculations. For example, the coolant temperature at the outlet of the radiator may be calculated or estimated based on the temperature of the coolant at the inlet/outlet of the fuel cell stack 12 and the vehicle operating conditions (e.g., when coolant is running through third loop 30).

The internal temperature of the PCM 16, which may be referred to as the "state of charge" of the thermal battery 24, may similarly be calculated or estimated based on the temperature of the coolant at the inlet/outlet of the fuel cell stack 12 and the vehicle operating conditions (e.g., when coolant is running through first loop 26 and/or second loop 28). The controller may calculate or estimate these values based on models and on information such as the thermal (e.g., thermal conductivity, heats of fusion, heat capacity, etc.) and physical (e.g., size, shape, geometry, flow rate, etc.) properties of the PCM 16, the coolant, the conduit 14, the heater core 32, and/or the radiator 34, as well as properties regarding heat rejection of the fuel cell stack 12. Accordingly, by monitoring the temperature of the coolant at a small number of locations (e.g., two or three), temperatures at other components of the TMS 10 may be accurately estimated and the number of sensors may be reduced. Reducing the number of sensors may make the TMS 10 less complex, less bulky, and less costly.

Figure 2:
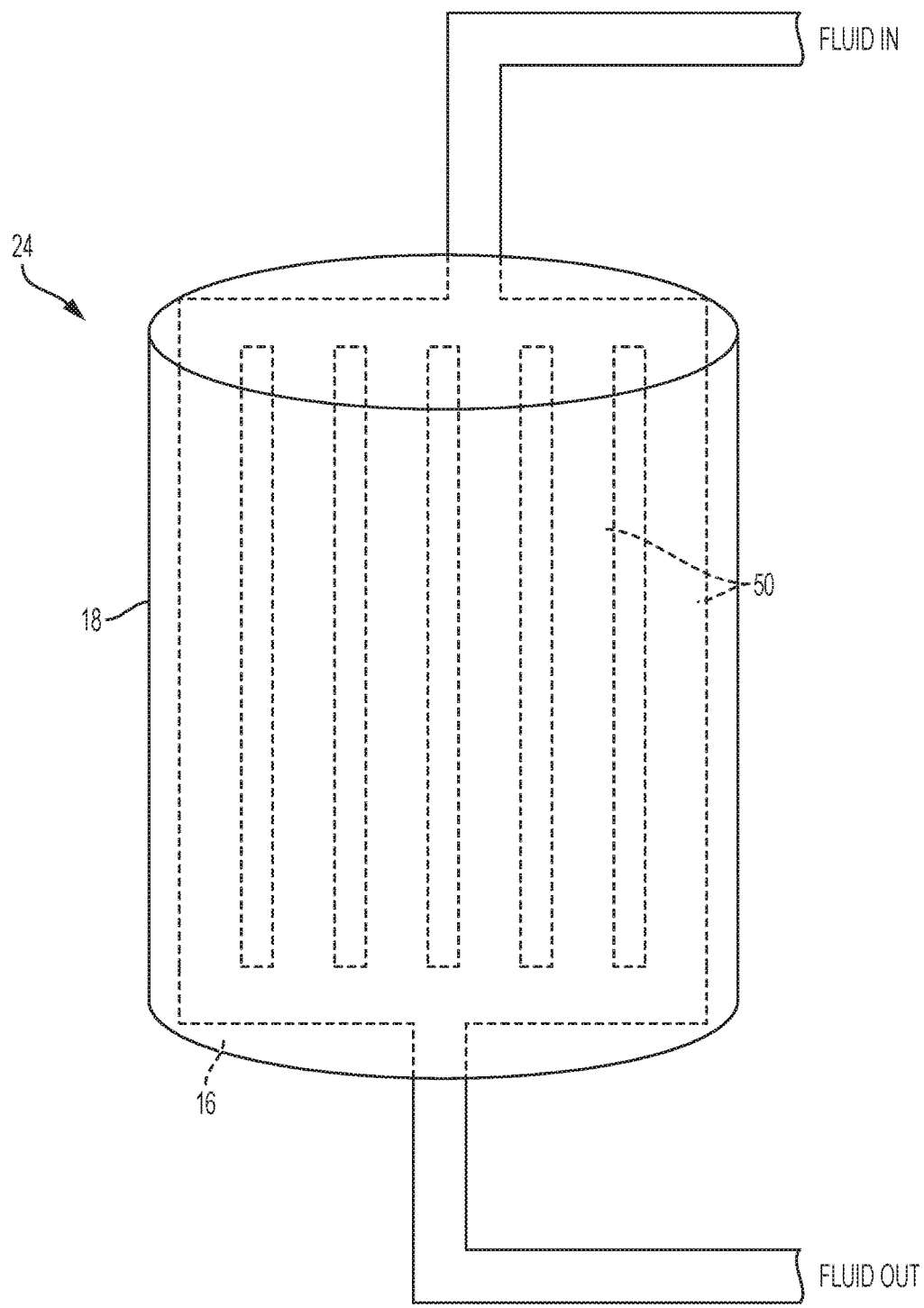
FIG. 2 is a schematic of a thermal battery including a phase change material, according to an embodiment.

With reference to FIG. 2, a schematic of an embodiment of the thermal battery 24 is shown. As described above, the thermal battery 24 may include a housing 18. As shown in FIG. 2, the housing 18 may be cylindrical, however, it may have any other suitable shape. For example, the housing 18 may be a rectangular prism (e.g., box-shaped) or other type of prism, or it may have an irregular shape. The housing 18 may be insulated or vacuum sealed for insulation to prevent heat/energy loss or gain from the PCM, depending on the condition/state of the PCM. The PCM 16 may be stored loose within the housing 18 or it may be encapsulated within another material. If the PCM is stored loose, the PCM and the housing materials may be chosen such that no corrosion or degradation occurs between them. Alternatively, the housing 18 may have a liner or coating that prevents interaction with the PCM.

In other embodiments, the PCM 16 may be encapsulated within the housing 18. In one embodiment, there may be one or only a few (e.g., 2-4) PCM compartments or encapsulations, wherein a relatively large amount of PCM is stored in each encapsulation. In another embodiment, the PCM may be encapsulated in a plurality of smaller capsules, for example, at least 5, 10, 15, 25, or 50 capsules. The capsuled PCM may then be referred to as beads or microcapsules. In any of these embodiments, the encapsulation material may be any material that is non-reactive with the PCM and also has a melting temperature higher than the PCM and higher than the max temperature of the coolant that will enter the thermal battery 24. The encapsulating material may be a polymer, a metal, or a ceramic. In at least one embodiment, the encapsulating material may be a good thermal conductor to transfer the heat energy from the PCM to/from the coolant. The encapsulating material may be rigid or flexible.

There may be one or more tubes 50 extending through or within the housing 18. The tube(s) 50 may have received the coolant from the housing inlet (not shown) and ultimately transport it to the outlet (not shown). In FIG. 2, there are a plurality of tubes 50 that extend vertically through the housing 18. Accordingly, the coolant may be split into multiple tubes and the recombined to be transported out of the outlet. In other embodiments, there may be a single or several tubes (e.g., 2-4) but they may wind through the housing 18 rather than extend substantially straight through it. For example, the tubes may have a tortious path, such as winding or serpentine, where they double back on themselves to increase surface area exposure to the PCM (loose or encapsulated). Therefore, whether through many tubes or through winding tubes (or both), the tubes 50 may allow the coolant to have prolonged exposure to the PCM in order to transfer heat energy between the coolant and the PCM.

While multiple embodiments of the thermal battery 24 are shown and described, there may be other configurations. Additional configurations of phase change materials and thermal batteries are described in commonly owned U.S. Pat. No. 8,661,800, issued Mar. 4, 2014; U.S. Pat. No. 8,794,195, issued Aug. 5, 2014; and U.S. Pat. No. 8,839,613, issued Sep. 23, 2014, the disclosures of which are hereby incorporated in their entirety by reference herein. Any portion (or all) of the phase change material systems disclosed therein may be incorporated into the present disclosure.

Figure 3:
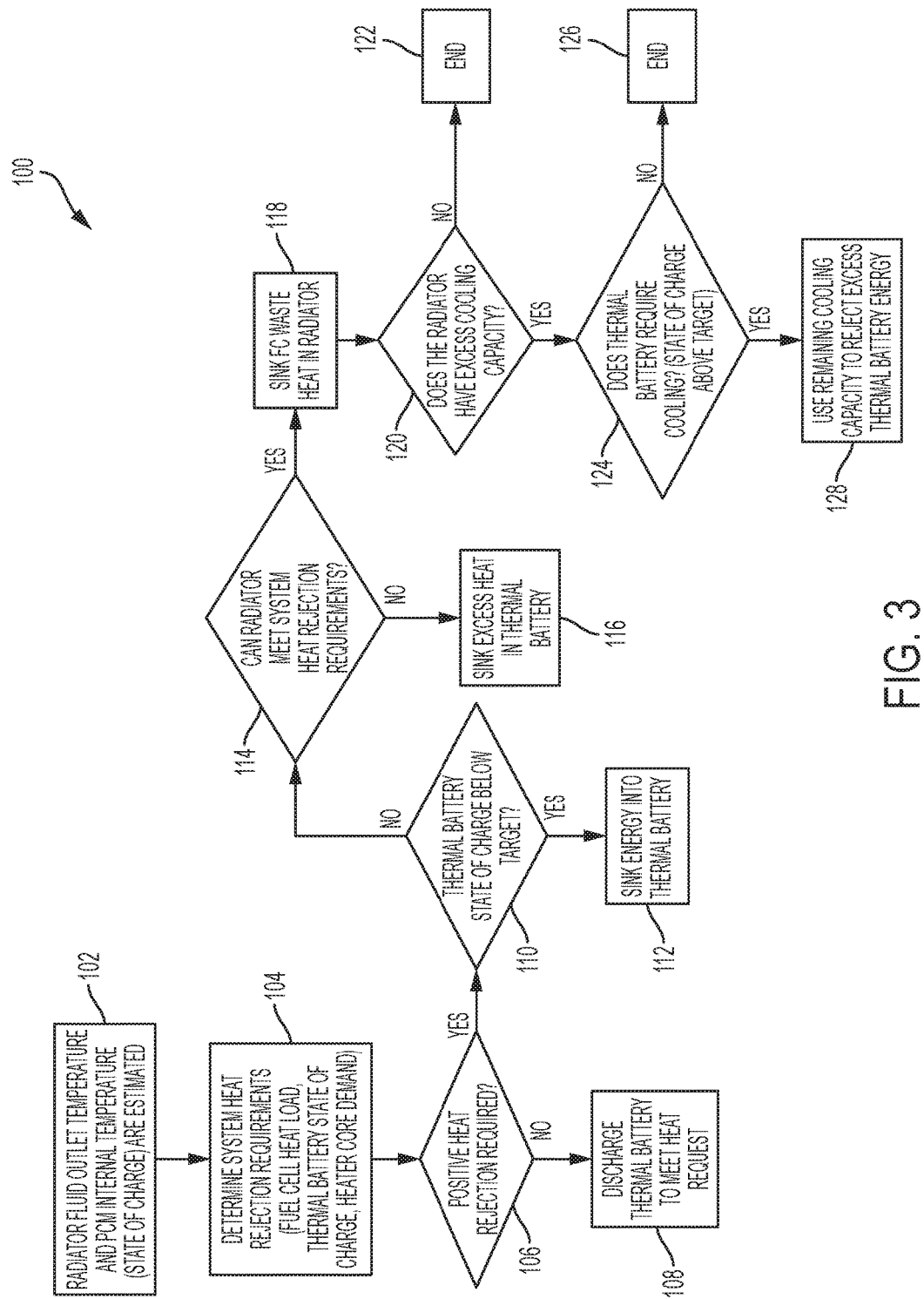
FIG. 3 is a flowchart showing an algorithm for operating a thermal management system, according to an embodiment.

With reference to FIG. 3, a flowchart 100 is shown describing an example of an algorithm for operating the TMS 10. The steps in the algorithm 100 may be carried out by a controller or controllers (e.g., including a CPU/microprocessor and memory). The algorithm may be stored in non-transitory memory. In step 102, the temperature of the coolant at the outlet of the radiator and/or the internal temperature of the PCM may be estimated (e.g., by the controller). As described above, these temperatures may be estimated based on the inlet/outlet temperatures of the fuel cell stack measured by temperature sensors, as well as on vehicle operating conditions and/or other factors. These values may be used to determine the heat sink potential of the TMS, for example, the amount of heat/energy that can be released to heat the fuel cell stack or the amount of heat/energy that can be absorbed or pulled from the fuel cell stack to the PCM and/or radiator.

In step 104, the heat rejections requirements of the system may be determined. This may include the fuel cell heat load, that state of charge of the thermal battery (e.g., internal temperature), the demand from the heater core, or others. These values may be determined by the controller based on the physical and thermal properties of the system components, the properties of the fuel cell stack, and the temperature data described above.

In step 106, a determination is made (e.g., by the controller) whether positive heat rejection is desired or required. Positive heat rejection may be desired or required if the fuel cell stack is operating at a temperature above a target operating temperature, which may be the optimum operating temperature or near/at the maximum operating temperature. For example, the maximum or upper level operating temperature of a hydrogen PEMFC may be about 95° C. However, the maximum temperature may vary depending on the fuel cell design.

If no positive heat rejection is desired or required in step 106 (e.g., negative heat rejection status), then in step 108 heat may be released from the thermal battery to raise the temperature of the fuel cell stack. Phrased another way, if additional heat energy is desired or needed in the fuel cell stack, for example, during cold start or in cold temperatures, then the thermal battery may be used to heat the fuel cell stack. The heat or energy may be transferred from the thermal battery to the fuel cell stack by cycling coolant through the thermal battery, where it may absorb heat from the PCM, and then through the fuel cell stack, where the heat may be released by the coolant and absorbed by the stack. An example of this transfer of coolant is described above and in FIG. 1 as the first loop 26. If the fuel cell stack is operating at or near the optimum temperature and does not require any additional heat energy or need to reject any heat energy, the algorithm may end (e.g., no coolant flow).

If positive heat rejection is desired or required in step 106 (e.g., positive heat rejection status), then in step 110 it may be determined whether the thermal battery is below its target internal temperature (state of charge). If it is, then in step 112 heat energy may be transferred to the thermal battery in order to increase its internal temperature, or "charge" the thermal battery. This may be performed in a similar manner to step 108, where coolant is transferred through the thermal battery and the fuel cell stack. However, unlike in step 108, in step 112 the fuel cell stack may provide the heat energy, which is absorbed by the coolant, and the PCM may absorb the heat energy from the coolant when it circulates therethrough.

If the thermal battery is at or above its target internal temperature in step 110, then it may be determined in step 114 if the radiator or heat exchanger can meet the heat rejections requirements of the fuel cell stack. This may be determined based on the known properties of the radiator or heat exchanger (e.g., size, geometry, thermal properties), the coolant flow rate, the coolant temperature, the current temperature of the radiator, or other factors. If the radiator cannot meet the rejection requirements, then in step 116 the excess heat energy may be transferred to the thermal battery. This may be performed by transporting at least a portion of the coolant through the thermal battery such that the PCM may absorb some heat energy from the excess heat generated by the fuel cell stack. An example of this transfer of coolant is described above and in FIG. 1 as the third loop 30. This may raise the internal temperature of the thermal battery to above its target temperature. However, there may be a temperature range that is above the target temperature but below a maximum temperature of the thermal battery wherein it is acceptable to operate.

If the radiator or heat exchanger can meet the heat rejection requirements, then in step 118 the radiator may be used to dissipate the excess heat energy from the fuel cell stack. The radiator may be used to dissipate all or substantially all of the excess heat energy. This may be performed by transporting coolant through the radiator and the fuel cell stack, but bypassing the thermal battery (e.g., using a three-way valve). An example of this transfer of coolant is described above and in FIG. 1 as the third loop 30.

In step 120, it may be determined whether the radiator or heat exchanger has excess cooling capacity above the current heat rejection of the fuel cell stack. If it does not, the algorithm may end in step 122. If there is excess cooling capacity, then in step 124 it may be determined whether the thermal battery requires or may benefit from cooling. As disclosed above, in certain situations the thermal battery may be heated above its target internal temperature, for example, if the radiator cannot handle the heat rejection requirements of the fuel cell stack. If the thermal battery does not need or benefit from cooling, then the algorithm may end in step 126. If the thermal battery does require or benefit from cooling, however, then the excess cooling capacity of the radiator may be used to cool the thermal battery in step 128. This may be performed by allowing coolant to flow through the radiator and the thermal battery, such as through the third loop 30.

In addition to the steps described above, if at any point extra heat is requested in the vehicle cabin and there is excess heat energy from the thermal battery, the fuel cell stack, and/or the radiator, it may be sinked to the heater core in the TMS. The heater core may be connected or coupled to a climate control system of the vehicle and the heat energy from the other components may be used to increase the air temperature of the vehicle cabin. A controller may determine whether the cabin temperature is below a certain threshold and, if so, may control the flow of coolant in the TMS such that the heater core temperature is increased. This may be used to heat the cabin during start-up in cold temperatures. It may also be used to supplement or replace conventional warming processes once the fuel cell stack is operating at or above the optimum operating temperature. In general, the passenger heat demand may be relatively small compared to the peak fuel cell heat rejection demands. Therefore, in some embodiments, the heat rejection from the heater core may be neglected and the controller may not use it as a control input or objective.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A fuel-cell thermal management system, comprising:
    a fuel-cell stack;
    a heat-exchanger;
    a thermal battery including a phase change material having a melting temperature of 50- to 120° C;
    a first coolant loop including the fuel-cell stack, the thermal battery and a first conduit, and excluding the heat-exchanger; and
    a second coolant loop including the fuel-cell stack, the thermal battery, the heat-exchanger, and a second conduit;
    the first conduit configured to flow a coolant from the thermal battery to the fuel-cell stack to transfer heat from the phase change material of the thermal battery to the fuel-cell stack, and
    the first conduit configured to flow coolant from the fuel-cell stack to the thermal battery to transfer heat from the fuel-cell stack to the phase change material of the thermal battery.

2. The system of claim 1, further comprising a third coolant loop including the fuel-cell stack, the thermal battery, a heater core coupled to a climate control system, and a third conduit, the third conduit configured to transfer heat from the thermal battery to the heater core.

3. The system of claim 1, further comprising a first temperature sensor configured to measure an inlet temperature of the coolant entering the fuel-cell stack and a second temperature sensor configured to measure an outlet temperature of the coolant leaving the fuel-cell stack.

4. The system of claim 1, wherein the first and second coolant loops include the first conduit.

5. The system of claim 1, wherein the phase change material has a latent heat of fusion of at least 100 kJ/kg.

6. The system of claim 1, further comprising a first pump included only in the second coolant loop and a second pump disposed upstream of an inlet of the fuel-cell stack.

7. The system of claim 1, wherein the first coolant loop includes an orifice restrictor downstream of the thermal battery and upstream of an inlet of the fuel-cell stack.

8. The system of claim 1, further comprising a three-way valve downstream of the thermal battery and configured to direct coolant to the first or second coolant loops.

9. The system of claim 1, wherein the phase change material is an encapsulated phase change material.

10. A fuel-cell thermal management system, comprising:
    a fuel-cell stack;
    a heat-exchanger;
    a thermal battery including a phase change material having a latent heat of fusion of over 100 kJ/kg;
    a first coolant loop including the fuel-cell stack, the thermal battery and a first conduit;
    a second coolant loop including the fuel-cell stack, the thermal battery, a heater core coupled to a climate control system, and a second conduit; and
    a third coolant loop including the fuel-cell stack, the thermal battery, the heat-exchanger, and a third conduit,
    the first conduit configured to flow a coolant from the thermal battery to the fuel-cell stack to transfer heat from the phase change material of the thermal battery to the fuel-cell stack, and
    the first conduit configured to flow coolant from the fuel-cell stack to the thermal battery to transfer heat from the fuel-cell stack to the phase change material of the thermal battery.

11. The system of claim 10, further comprising a first temperature sensor configured to measure an inlet temperature of the coolant entering the fuel-cell stack and a second temperature sensor configured to measure an outlet temperature of the coolant leaving the fuel-cell stack.

12. The system of claim 10, wherein the material in the phase change thermal battery has a melting temperature of 50 to 120° C.

13. The system of claim 10, further comprising a first pump included only in the third coolant loop and a second pump disposed upstream of an inlet of the fuel-cell stack.

14. The system of claim 10, wherein the first, second and third coolant loops include the first conduit.

15. The system of claim 10, wherein the third coolant loop is configured to cool the fuel-cell stack when the fuel-cell stack is above a target operating temperature and cool the thermal battery when it is above the target temperature.

16. A fuel-cell thermal management system, comprising:
    a fuel-cell stack;
    a heat-exchanger;
    a thermal battery including a phase change material;
    a first coolant loop including a fuel-cell stack, the thermal battery and a first conduit, and excluding the heat-exchanger; and
    a second coolant loop including the fuel-cell stack, the thermal battery, the heat-exchanger, and a second conduit; and
    a processor configured to direct a coolant flow from the thermal battery to the fuel-cell stack to transfer heat from the phase change material of the thermal battery to the fuel-cell stack based on a negative heat rejection status of the fuel-cell stack and to direct the coolant flow from the fuel-cell stack to the thermal battery to transfer heat from the fuel-cell stack to the phase change material of the thermal battery based on a positive heat rejection status of the fuel-cell stack when the thermal battery is below a target temperature.

17. The system of claim 16, wherein the processor is further configured to direct the coolant flow to transfer heat from the thermal battery to the heat-exchanger when the thermal battery is above the target temperature.

18. The system of claim 16, wherein the processor is further configured to direct the coolant flow to transfer heat from the fuel-cell stack to the heat-exchanger based on a positive heat rejection status of the fuel-cell stack.

19. The system of claim 18, wherein the processor is further configured to direct the coolant flow to transfer heat from the fuel-cell stack to the thermal battery based on a positive heat rejection status of the fuel-cell stack when the thermal battery is above a target temperature and the heat-exchanger is at a maximum cooling capacity.

20. The system of claim 16, wherein the processor is further configured to direct the coolant flow to transfer heat from the thermal battery to a heater core of a climate control system.

* * * * *